2,958,630
Patented Nov. 1, 1960

2,958,630

TREATMENT OF BLOOD TO YIELD AMINO ACIDS

Havard L. Keil, Clarendon Hills, Edward F. Cavanaugh, Wilmette, and James B. Himes, Lansing, Ill., assignors to Armour and Company, Chicago, Ill., a corporation of Illinois No Drawing. Filed July 17, 1957, Ser. No. 672,369

13 Claims. (Cl. 195—29)

This invention relates to the treatment of blood to produce valuable products therefrom. It relates particularly to the preparation of amino acids from blood proteins. It also relates to the preparation of a protein food product from blood.

Methods of treating blood to obtain valuable products therefrom have always been of considerable interest to the packinghouse industry. It is common in packinghouse operations to separate various fractions of freshly drawn blood by means of centrifuging shortly after the blood is obtained. By the processes of centrifugation, blood is separated into two fractions, a "dark albumin" fraction and a "light albumin" fraction, as these fractions are known in the language of the trade. The "light albumin" fraction is of considerably higher value than the "dark albumin" fraction, and is composed primarily of albumin and globulin. The dark fraction, known as "dark albumin," is composed primarily of hemoglobin. From 100 pounds of natural blood one obtains approximately 14.5 pounds of dark albumin and about 5.5 pounds of light albumin. Dark and light albumin are commercially produced articles of commerce, and have been utilized for many purposes and are the starting materials in the production of several by-products. It is already known that catalase can be produced from the dark albumin fraction by a process of alum precipitation. It is also known that hemin, which is a strong oxidizing catalyst having various uses in industrial processes requiring oxidation catalysts, is found in the dark fraction conjugated with globin, the protein element of hemoglobin.

Investigators have previously attempted to hydrolyze the various blood proteins and have utilized several methods in these attempts. It is fairly well known that the dark albumin (hemoglobin) fraction of blood contains an enzyme inhibitor substance. For this reason it has been economically undesirable to hydrolyze hemoglobin per se by means of enzymes.

We have now discovered means by which the protein of liquid hemoglobin can be converted to native amino acids through the action of proteolytic enzymes such as are contained within cattle and hog pancreas glands.

It is an object of this invention to provide a means of enzymatically hydrolyzing hemoglobin. It is a particular object of the invention to provide a process by which amino acids may be obtained from blood. It is also an object of the invention to provide a protein product derived from hemoglobin which is water-soluble and devoid of taste or odor.

The invention is based upon the discovery that the enzyme inhibitors present in hemoglobin can be precipitated by bringing them in contact with an alum solution or an aluminum salt solution, and that after the removal of the precipitate hemoglobin can be enzymatically hydrolyzed to the amino acid stage or to any intermediate stage of hydrolysis.

In the process of this invention blood is subjected to a treatment comprising centrifuging the blood to separate it into the two fractions which are commonly referred to as dark albumin and light albumin. The dark albumin, or hemoglobin, fraction which contains the formed elements or red blood corpuscles is then diluted with water and its pH adjusted with an acid to within the range of from about 4 to 6. Following the acidification step, an anti-enzyme precipitant is introduced into the blood solution and catalase and the enzyme inhibitors present in the hemoglobin, or dark albumin fraction, are precipitated. Since albumin and globulin, the primary constituents of "light albumin," are precipitated by alum, the "dark albumin" is the preferred starting material for the process of this invention, however whole blood may be used and if whole blood is treated a larger precipitate comprising catalase, albumin, globulin and the enzyme inhibitor will be obtained in the alum precipitation step. Following the enzyme inhibitor and catalase precipitation step, the precipitate is removed from the solution and the remaining solution which contains water-soluble proteins is adjusted to a pH favorable to the action of enzyme upon the protein substrate, or to about 7.4. A proteolytic enzyme such as is commonly derived from hog or cattle pancreas glands is then added to the solution. The solution is then maintained at a temperature and pH favorable to the action of the proteolytic enzyme upon the blood protein. During the course of this enzymatic hydrolysis reaction the solution gradually becomes more alkaline, that is the pH rises to about 8.5. In order to maintain the pH of this solution at a pH which is conducive to the enzymatic reaction, it is desirable prior to the addition of the enzyme to adjust the pH of the solution to approximately 7.4 with sodium bicarbonate which has a buffer effect upon the solution. The reaction temperature which has been found to be most desirable is about 37° C. We have found that the enzymatic hydrolysis is normally completed within about 4 to 7 days.

After the proteolysis reaction is completed, the solution is acidified to such a degree that the pH of the solution does not correspond to the isoelectric point of the amino acids present in the hydrolysate. At such an acid pH, most all of the amino acids are soluble, while hemin is insoluble and can be filtered from the solution. The amino acids are the least soluble at their isoelectric point, and therefore we have found it desirable to acidify the solution to a pH of less than 5 and preferably in the range of from about 1 to 3.

In a preferred form of the process sodium bicarbonate is used to bring the solution to a basic pH prior to the addition of the enzyme; in such case there may be a foaming problem during the acidification after the proteolysis reaction is completed. We have found that when caprylic alcohol is added to the solution and is present during the acidification, the foam problem is largely eliminated.

The anti-enzyme precipitant of this invention may be any of the commonly known alums such as are described in the Hackh Chemical Dictionary. In other words, in the use of the word "alum" we are not limited to any particular metal salt. In the choice of a particular alum we prefer aluminum salts and of the aluminum salts, the sodium aluminum sulfate is preferred. We may also use aluminum salts per se. Sodium aluminum sulfate is a very desirable alum for use in the process of this invention. We have also found potassium aluminum sulfate to be very desirable in the process of the invention. Aluminum sulfate may be used alone or in connection with a salt forming an alum with aluminum sulfate in aqueous solution.

The enzyme used in the process of the invention may be any proteolytic enzyme which causes the proteolysis of a protein to be completed to the amino acid stage. We have found that the mixed enzymes obtained from the pancreas gland of cattle or hogs may be utilized. The desirable enzymes for the preparation of amino acids include trypsin, chymotrypsin and erepsin. There are many enzymes which are proteolytic in nature which do not complete the proteolysis reaction, that is there are many enzymes such as pepsin which cause the proteolysis of the protein to proceed approximately to the proteose stage and may be used in the preparation of a partially hydrolyzed product.

With regard to the pH at which the anti-enzyme precipitant is added to the blood, the use of sulfuric acid is desirable to minimize the use of alum solution or aluminum salt. Except for the expense involved it is entirely feasible to add alum to blood to obtain the desired pH of approximately 4.7. However, to minimize the use of an alum solution, we prefer to use an acid such as sulfuric acid to approximate the desired pH for the catalase and enzyme inhibitor precipitation. The guiding principle in the acidification is the desire to approximate the isoelectric point of catalase which is approximately 5. It is thought that the isoelectric point of the proteolytic enzyme inhibitor is approximately that of catalase. Since proteins are least soluble at their isoelectric point, catalase and the proteolytic enzyme inhibitor are thought to be most insoluble at a pH of about 5, the isoelectric point of catalase. If the solution is made too acid there will be a tendency for the undesirable materials to be put in solution again and hence retained with the hemoglobin.

It has been found desirable to kill or inactivate microorganisms which might be present in the solution and which would multiply during the enzymatic hydrolysis reaction. It is necessary in the selection of a bacteriostat to choose an agent which is active against bacteria and other microorganisms generally, but which has no tendency to inactivate the enzymes upon which we depend to proteolyze the blood protein. In this connection we prefer to use chloroform and have found it also possible to use thymol, sodium benzoate, acetone, toluene and chlorobutanol. Other agents which are active against microoragnisms, but which do not inactivate proteolytic enzymes, may also be used.

It is well known in the industry that the dark albumin, or hemoglobin, which is obtained by the centrifugation of blood, is very unpalatable and has an exceptionally foul odor. It is also known that this susbtance has a high nutritive value by virtue of the content of essential amino acids. If palatable the dark albumin would be a desirable nutrient. We have discovered that following the alum precipitation described above, that the protein remaining after such precipitation and the removal of catalase and other materials is bland, odorless and yet retains its nutritive value. This purified protein may be incorporated into a food. In the preparation of this food product dark hemoglobin is subjected to an alum precipitation, the precipitated materials are removed, and the soluble protein remaining in solution is isolated.

The invention may be further illustrated by the following examples:

EXAMPLE I

To 400 gms. of plant run dark albumin (hemoglobin) having 35% total solids was added 2000 cc. of water, and the mixture was stirred well to rupture the red blood cells. One cc. of concentrated sulfuric acid was then added to the solution to give a pH of about 5.2 Fifty cc. of a 10% potassium aluminum sulfate solution was next stirred in to produce a final pH of 4.7. The mixture was let stand for about 1 hour to insure good flocculation, and was then poured onto a fluted filter paper and allowed to filter by gravity.

To the recovered filtrate was added 60 gms. of sodium bicarbonate, which brought the pH to 7.4. Ten gms. of a proteolytic enzyme obtained from hog pancreas was made up into a slurry with about 50 cc. of water and was mixed into the filtrate. Twenty cc. of chloroform was then added for preservation purposes and the batch was held at 37° C. for a period of around 4 days for proteolysis to occur.

After the proteolysis reaction was completed there was added 40 cc. of concentrated sulfuric acid to the solution to bring the pH to 2.0. Caprylic alcohol, approximately 5 cc. was used as a foam breaker during the acidification. Twenty gms. of a diatomaceous earth filter-aid was then stirred in and the hemin containing precipitate was removed by suction filtration. The precipitate may be held for the recovery of hemin.

To the dark amber but clear filtrate was added 20 gms. of activated charcoal, together with 20 gms. of diatomaceous earth filter-aid. The mixture was stirred well, and filtered by suction to yield a clear filtrate with a light pink color. The filtrate was evaporated under vacuum to give a white, friable, non-hygroscopic mixture of amino acids.

EXAMPLE II

Preparation of blood protein product

Plant run liquid hemoglobin from bovine sources and regularly containing 35% of protein solids, obtained by the centrifugation of fresh blood, was weighed and mixed with 5 weights of 37° C. water. The solution was well stirred to promote the complete rupture of red cells for the liberation of hemoglobin. The pH of the hemoglobin solution was about 7.

The pH of the solution was adjusted to 5.2 by the addition of approximately 0.25 cubic centimeters of concentrated sulfuric acid for each 100 grams of liquid hemoglobin. After stirring well, 33 cubic centimeters of a 10% potassium aluminum sulfate solution for each 100 grams of liquid hemoglobin was mixed well into the batch. The pH was dropped thereby to 4.7.

After a 30 minute flocculation period, the anti-enzymic bodies were precipitated and removed by gravity filtration.

The purified hemoglobin solution was dried in a wind oven at about 35° C. The protein was obtained in flake form and was found to possess a bland taste and was odorless.

EXAMPLE III

Preparation of amino acids

Two hundred grams of liquid hemoglobin obtained by the centrifugation of fresh blood and the collection of the dark albumin fraction, containing approximately 35% of protein solids, was mixed into 1 liter of 37° C. water. The solution was stirred to promote the rupture of the formed elements for the liberation of hemoglobin. The pH of this hemoglobin solution was found to be about 7.0.

The pH of the hemoglobin solution was adjusted to 5.2 by the addition of about 0.5 cubic centimeters of concentrated sulfuric acid. After stirring, 65 cubic centimeters of a 10% potassium aluminum sulfate solution was mixed into the batch causing the pH of the solution to drop to about 4.7. The solution was allowed to stand for approximately 30 minutes after which time a precipitate was formed. The precipitate contained the enzyme inhibitor of hemoglobin and was removed by gravity filtration through fluted filter paper.

The filtrate containing the purified hemoglobin was adjusted to a pH of 7.5 by the addition of 110 grams of sodium bicarbonate. Pancreatin having a proteinase potency of 1:90 was mixed into the solution. The pancreatin or proteolytic enzyme added amounted to 4.2 grams which is 6% of the 70 grams of protein solids contained in the 200 grams of liquid hemoglobin. Ten cubic centimeters of chloroform was added to the solution and the batch was subjected to incubation at 37° C. for 22 days. After incubation, upon removal from the incubator, the pH of the solution was about 10. A small amount of caprylic alcohol was added to reduce foaming and 52 cc. of concentrated sulfuric acid was added to bring the pH of the solution to 2. A Buchner funnel coated with a diatomaceous-earth filter aid was used to filter out the small amount of insoluble materials. The dark amber filtrate was clarified to an almost colorless liquid by the use of 10 grams of activated carbon at room temperature followed by filtration. The filtrate was dried in vacuum to recover 152 grams of product. A nitrogen analysis showed the product to run about 50% amino acids or a calculated over-all yield of 71% based on the amount of starting hemoglobin protein.

In various other experiments it was found that other alum solutions, particularly sodium aluminum sulfate and aluminum sulfate were of substantially equal utility in the precipitation of the enzyme inhibitor.

EXAMPLE IV

Four hundred grams of commercial liquid hemoglobin obtained by the centrifugation of cattle blood was treated according to the alum precipitation purification step of Example III. After purification the filtrate was adjusted to a pH of 7.4 by the addition of 60 grams of sodium bicarbonate. Ten grams of pancreatin having a proteinase activity of 1:90 was mixed into the solution. Twenty cubic centimeters of chloroform was added to this solution and the batch was held at 37° C. in an incubator for 7 days.

The hydrolyzed blood protein solution, upon removal from the incubator, had a pH of 8.4. Caprylic alcohol (5 cc.) and 40 cc. of concentrated sulfuric acid was added to the solution which was thereby brought to a pH of 2. The solution was filtered through a Buchner funnel to remove insoluble materials. Following the filtration, 20 grams of activated carbon was added and the mixture was again filtered. The resulting colorless solution was dried in vacuum and analyzed for nitrogen. The yield of amino acids amounted to 73% of the weight of the hemoglobin protein used initially.

EXAMPLE V

Six hundred grams of commercial liquid hemoglobin obtained by the centrifugation of cattle blood was treated according to the alum precipitation procedure of Example III. The filtrate was not dried but rather was adjusted to a pH of 7.2 by the use of 90 grams of sodium bicarbonate. 15 grams of proteolytic enzyme having a proteinase activity of about 1:90 was introduced and then the solution was stirred. The enzyme used amounted to 7% of the protein solids in 600 grams of hemoglobin. 20 cubic centimeters of chloroform was added to the solution for preservation purposes during the four days of incubation at 37° C.

After incubation the digest was removed from the incubator and was found to have a pH of 7.5. After adding 5 cc. of caprylic alcohol to reduce foaming, 60 cc. of concentrated sulfuric acid was added slowly with stirring to bring the solution to a pH of 2.1. The solution was filtered by suction through a Buchner funnel coated with a diatomaceous-earth filter aid. The amber filtrate was lighter in color than those filtrates obtained in previous examples at this point. 20 grams of activated charcoal was used to clarify the solution so that it was water clear. The dry product resulting from an evaporation in vacuo was white in color and when analyzed for nitrogen, calculated to amino acids and weighed, proved to represent 81% of the starting hemoglobin protein.

While in the foregoing specification, specific embodiments of the invention have been set out in detail for purposes of illustration, it will be apparent to those skilled in the art that many variations may be made without departing from the scope and spirit of the invention.

We claim:

1. In a process of preparing amino acids from blood having a pH within the range of about 4 to 6, the step of contacting a solution of blood with an anti-enzyme precipitant comprising an aluminum sulfate solution whereby catalase and enzyme inhibitors present in the blood are precipitated, separating the precipitated solids from the supernatant solution which contains soluble blood proteins, and subjecting said soluble blood proteins in said solution to the action of a proteolytic enzyme.

2. A method for the preparation of protein degradation products from blood comprising separating the formed elements from blood, diluting said formed elements with water to form a solution of formed elements and bringing the same to a pH within the range of about 4 to 6, mixing said solution with an anti-enzyme precipitant comprising an aluminum sulfate solution to precipitate the enzyme inhibitor present in said solution of formed elements, separating the precipitate from the supernatant solution containing soluble blood protein, and subjecting the proteins of said supernatant solution to the action of a proteolytic enzyme under conditions of pH and temperature favorable to enzymatic hydrolysis.

3. A method for the preparation of amino acids from blood comprising separating the formed elements from blood, diluting said formed elements with water to form a solution of formed elements, bringing the pH of said solution to within the range of about 4 to 6, mixing said solution with an anti-enzyme precipitant comprising a double salt of aluminum sulfate and a salt selected from the group consisting of potassium sulfate and sodium sulfate to precipitate the enzyme inhibitor present in said solution of formed elements, separating the precipitate from the supernatant solution containing soluble blood protein, and subjecting the proteins of said supernatant solution to the action of a proteolytic enzyme under conditions of pH and temperature favorable to enzymatic hydrolysis.

4. A method for the preparation of amino acids from blood comprising separating the formed elements from blood, diluting said formed elements of blood with water to form a solution of formed elements bringing the pH of said solution to within the range of about 4 to 6 in the presence of an anti-enzyme precipitant comprising an aluminum sulfate solution to precipitate enzyme inhibitors present in the blood, separating the precipitate from the supernatant solution, adjusting the pH to favor enzymatic hydrolysis and adding a proteolytic enzyme to said supernatant solution whereby blood proteins contained therein are enzymatically hydrolyzed to yield mixed amino acids.

5. In the hydrolysis of the formed elements of blood proteins, the steps of separating the formed elements of blood from the remaining portion by centrifugation, diluting the formed elements with water to form a solution of blood, acidifying said blood solution to a pH of from about 5 to 6, adding an anti-enzyme precipitant comprising an aluminum sulfate solution to said blood solution to produce a precipitate containing enzyme inhibitors, separating the supernatant from the precipitate contained in said solution, adjusting the pH of said supernatant to a pH favorable to enzymatic hydrolysis adding a proteolytic enzyme to said supernatant solution to digest the water-soluble blood proteins contained in said solution, acidifying said solution after digestion to a pH favoring the solution of amino acids, separating the hemin-containing precipitated solids from said acidified solution containing mixed amino acids.

6. The process of claim 5 wherein said anti-enzyme precipitant is a solution of sodium aluminum sulfate.

7. The process of claim 5 wherein said anti-enzyme precipitant is a solution of potassium aluminum sulfate.

8. The process of claim 5 wherein the step of adjusting the pH of the supernatant to favor enzymatic hydrolysis is accomplished by the use of sodium bicarbonate.

9. The process of claim 8 wherein the pH of the supernatant is adjusted to within the range of from about 7 to 8.

10. A process for the treatment of blood which comprises centrifuging whole blood to separate a fraction containing blood corpuscles from said blood, diluting said blood corpuscle fraction with water to obtain a blood protein solution, adjusting the pH of said blood protein solution to within the range of about 5 to 6, adding an aluminum sulfate solution to said blood protein solution to bring the pH of said blood protein solution to within the range of about 4 to 5, separating the precipitate from said blood protein solution, adjusting the pH of said blood protein solution to within the range of from about 6 to 8, adding a proteolytic enzyme to said blood solution and maintaining said solution at a temperature and pH favorable to the action of said proteolytic enzyme whereby said blood protein solution is converted to a blood protein hydrolysate solution, acidifying said blood protein hydrolysate solution to a pH range wherein amino acids are soluble after the enzymatic hydrolysis reaction is substantially completed, separating the precipitated hemin-containing materials from said blood protein hydrolysate solution which is a mixture of amino acids.

11. The process of claim 10 wherein a proteolytic enzyme tolerated bactericidal agent is present in said supernatant solution during the enzymatic hydrolysis reaction, said bactericidal agent being effective to prevent the propagation of microorganisms while being without effect on said proteolytic enzyme.

12. The process of claim 11 wherein said bactericidal agent is chloroform.

13. In the preparation of a bland odorless protein food product from natural blood, the steps of centrifuging the blood to separate the dark albumin from the light albumin, adjusting the pH of the dark albumin solution to within the range of about 4 to 6, adding an anti-enzyme precipitant comprising an aluminum sulfate solution to the dark albumin solution to precipitate objectionable materials from said dark albumin, and separating the remaining soluble protein portions of the dark albumin.

References Cited in the file of this patent

UNITED STATES PATENTS

| | | |
|---|---|---|
| 1,063,302 | Thompson | June 3, 1913 |
| 1,599,031 | Jones | Sept. 7, 1926 |
| 2,456,297 | Melnick | Dec. 14, 1948 |
| 2,554,632 | Nesset | May 29, 1951 |
| 2,614,063 | Keil | Oct. 14, 1952 |